United States Patent
Erden et al.

(10) Patent No.: US 9,613,642 B1
(45) Date of Patent: Apr. 4, 2017

(54) READ/WRITE HEAD WITH A SWITCHING ELEMENT COUPLED TO READ OR WRITE TRANSDUCERS

(71) Applicant: Seagate Technology LLC, Cupertino, CA (US)

(72) Inventors: Mehmet Fatih Erden, St. Louis Park, MN (US); Christopher Anthony Markey, Lakeville, MN (US); Jon D. Trantham, Chanhassen, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/056,755

(22) Filed: Feb. 29, 2016

(51) Int. Cl.
*G11B 5/09* (2006.01)

(52) U.S. Cl.
CPC .................. *G11B 5/09* (2013.01)

(58) Field of Classification Search
CPC ..... G11B 27/36; G11B 5/012; G11B 2220/20; G11B 2220/90; G11B 5/09; G11B 20/10009; G11B 15/14; G11B 5/0086; G11B 5/60005; G11B 5/59633; G11B 5/54
USPC ............... 360/31, 39, 46, 55, 61, 64, 75
See application file for complete search history.

(56) References Cited

U.S. PATENT DOCUMENTS

| | | | |
|---|---|---|---|
| 5,426,758 A | | 6/1995 | Candelaria et al. |
| 5,541,780 A | * | 7/1996 | Han ............. G11B 15/026 360/61 |
| 5,805,386 A | * | 9/1998 | Faris ............. G11B 5/4813 360/264.4 |
| 6,111,718 A | * | 8/2000 | Jones ............. G11B 19/00 360/62 |
| 6,628,467 B2 | | 9/2003 | Cyrusian |
| 7,835,104 B2 | | 11/2010 | Yamashita et al. |
| 8,665,547 B1 | | 3/2014 | Yeo et al. |
| 8,824,249 B2 | | 9/2014 | Erden et al. |
| 8,922,939 B1 | | 12/2014 | Knigge et al. |
| 9,001,453 B1 | | 4/2015 | Knigge et al. |
| 9,202,490 B2 | | 12/2015 | Zuckerman et al. |
| 2005/0152067 A1 | | 7/2005 | Yip et al. |
| 2011/0249361 A1 | * | 10/2011 | Mathew ............. G11B 5/012 360/75 |
| 2013/0155538 A1 | | 6/2013 | Contreras |
| 2015/0077879 A1 | | 3/2015 | Contreras et al. |

OTHER PUBLICATIONS

Dec. 20, 2016, File History for U.S. Appl. No. 15/086,959 as retrieved from the U.S. Patent and Trademark Office on Dec. 20, 2016, 81 pages.

* cited by examiner

*Primary Examiner* — Nabil Hindi

(74) *Attorney, Agent, or Firm* — Hollingsworth Davis, LLC

(57) ABSTRACT

A read/write head includes two or more first transducers of a first type, the first type selected from a magnetic read transducer and a magnetic write transducer. The read/write head includes one or more switching elements coupled to the two or more first transducers. The switching elements are configured to, in response to a control signal, couple a selected one of the two or more first transducers to a preamplifier circuit and decouple others of the two or more first transducers from the preamplifier circuit.

20 Claims, 7 Drawing Sheets

US 9,613,642 B1

READ/WRITE HEAD WITH A SWITCHING ELEMENT COUPLED TO READ OR WRITE TRANSDUCERS

SUMMARY

Various embodiments described herein are generally directed to a read/write head with a switching element coupled to read or write transducers. In one embodiment, a read/write head includes two or more first transducers of a first type, the first type selected from a magnetic read transducer and a magnetic write transducer. The read/write head includes a switching element coupled to the two or more first transducers. The switching element is configured to, in response to a control signal, couple a selected one of the two or more first transducers to a preamplifier circuit and decouple others of the two or more first transducers from the preamplifier circuit.

In another embodiment, a method involves determining a change of an operational criterion of a disk drive. In response to the change of the operational criterion, a signal is sent to a read/write head having a plurality of transducer. The transducers include at least one of read transducers and write transducers. In response to the signal, a first group of the transducers is coupled, via a switching element of the read/write head, to a preamplifier circuit and a second group of transducers is decoupled from the preamplifier circuit via the switching element. The first group of transducers is then used to access a recording medium according to the change in the operational criteria.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
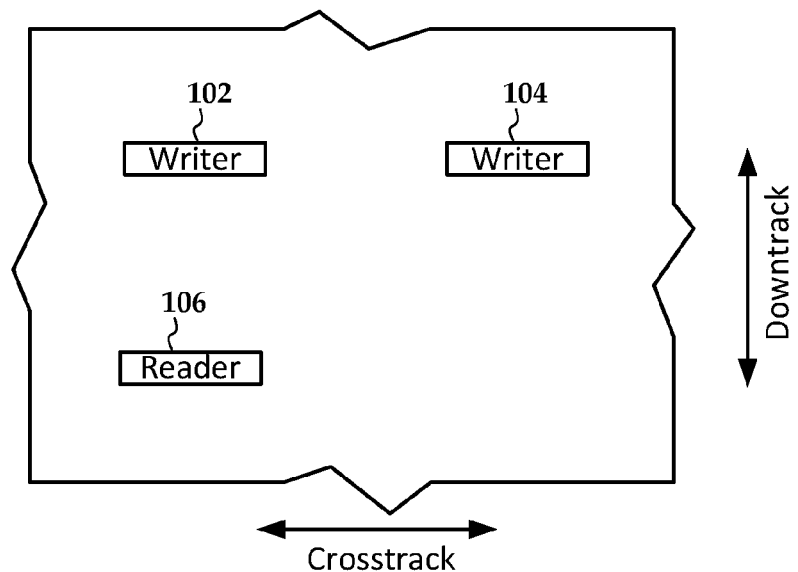
FIGS. 1 and 2 are block diagrams of read/write head transducers according to example embodiments.

The present disclosure generally relates to magnetic data storage device such as hard disk drives (HDDs). With today's perpendicular magnetic recording (PMR) technology, conventional HDD architectures are close to the superparamagnetic limit, which restricts the minimum bit size on magnetic recording media. New technologies based on heat-assisted magnetic recording (HAMR) and bit-patterned media (BPM) can record data at target higher areal density (AD) than PMR assuming conventional one-dimensional (1-D) system designs and drive architectures. In contrast, the magnetic media surface, in principle, provides a two-dimensional (2-D) recording environment.

The system design and the resulting drive architecture of conventional HDDs constrains an inherently 2-D system to a 1-D system due, e.g., to cost and complexity considerations. In parallel with HAMR and BPM, the overall 1-D design constraints are being further explored to see if the current recording technologies such as HAMR or BPM can support higher AD and/or better drive performance by modifying some of those constraints to make the system utilize the 2-D nature of the media surface, which is called Two-Dimensional Magnetic Recording (TDMR). This technology also includes single track-of-interest version, what is known as multi-sensor magnetic recording (MSMR).

A TDMR drive includes multiple read transducers (readers) built onto the same head-gimbal assembly (HGA). The readers may be arranged such that different readers or groups of readers cover different regions or recording zones of the media, and the signals from the readers can be read separately or combined. An example of the latter includes two-dimensional magnetic recording (TDMR), which can combine multiple read signals in a number of ways. For example, multiple read signals may be used to reduce the effects of adjacent-track interference by reading signals from a target track and at least part of an adjacent track. In other cases, a TDMR device may be configured to simultaneously decode two or more tracks in parallel.

Interlaced Magnetic Recording (IMR) is a recording technique that writes adjacent tracks with differing recording characteristics. A drive utilizing IMR may utilize multiple write elements (writers) on each recording head to improve qualities of the recorded signal. An IMR device generally writes adjacent tracks at different track widths, e.g., by utilizing narrower and wider write elements. Adjacent tracks may also be written at different linear bit densities. Generally, data of narrow, interlaced data tracks overwrites edges of adjacent and previously written wider data tracks. Similar to shingled media recording (SMR), IMR allows writing narrower tracks that would not otherwise be possible using a conventional track arrangement, but without some of the constraints of SMR.

A conventional HGA includes a single read/write head having a single writer (e.g., write pole) and reader (e.g., magnetoresistive sensor). This reader/writer will be used across the whole surface of the magnetic storage medium for all zones and stages of data recovery. In contrast, an IMR or TDMR drive may use different readers and/or writers over different regions of the disk. This can optimize some aspects of the performance, e.g., provide improved performance in high skew regions of the disk.

One challenge in implementing TDMR relates to the number of bond pads on the back of the slider. A flex circuit is bonded (e.g., soldered) to these bond pads and carries the signal along an actuator arm to the system controller circuitry (e.g., preamplifiers, read/write channels). If each additional read or write transducer requires one or more additional bond pads, this could either increase the size of the recording head, or decrease the pitch of the bond pads. Both of these can add to the cost to the recording head. In embodiments below, a read/write head includes features that help to minimize the number of interconnections required for coupling multiple read/write transducers to controller circuitry.

In FIG. 1, a view of a media-facing surface shows the arrangements of readers and writer for an IMR read/write head according to an example embodiment. In this view, two writers 102, 104 are arranged in a cross-track direction from one another, and a reader 106 is located downtrack from the first writer. The different writers 102, 104 are turned on for a given track within a series of alternatively wider and narrower tracks. This arrangement of tracks may be repeated for all data zones and stages of data recovery. An IMR may use other arrangements besides that shown here, e.g., writers 102, 104 may also be offset in a downtrack direction and, if so may also overlap in a cross-track direction, reader 106 may be aligned with none of the writers in a downtrack direction, reader 106 may be located uptrack of the writers, etc.

Figure 2:
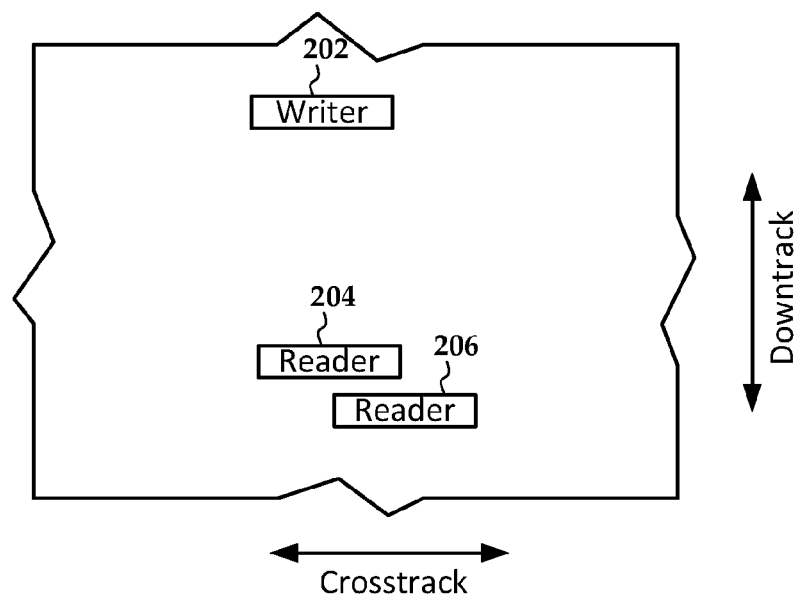

In FIG. 2, a view of a media-facing surface shows the arrangements of readers and writer for a TDMR read/write head according to an example embodiment. In this view, one writer 202 downtrack from two readers 204, 206, which are arranged along a cross-track direction from one another and are also offset in a downtrack direction. The different readers 204, 206 may read one or more tracks simultaneously in some modes, or may be turned on separately in some cases. Conventionally, the readers 204, 206 may be configured to operate the same over all data zones and stages of recovery regardless of the arrangement/modes.

As noted above, single/multiple writer/reader elements on the same HGA are assumed to be used the same at all the data zones and stages of data recovery. However, for different regions, e.g., different data zones on the media, it may be desirable to use different designs for writers and/or readers for that specific case. In this disclosure a matrix reader/writer head is proposed that can provide this ability. For example, a read/write head may be switchable between two modes as shown in FIGS. 1 and 2. This involves turning head elements (e.g., readers, writers) on and off based on predefined criteria. This can optimize the use of the storage media, e.g., providing best results for the different data regions on the disk in terms of capacity, performance, reliability, etc.

Figure 3:
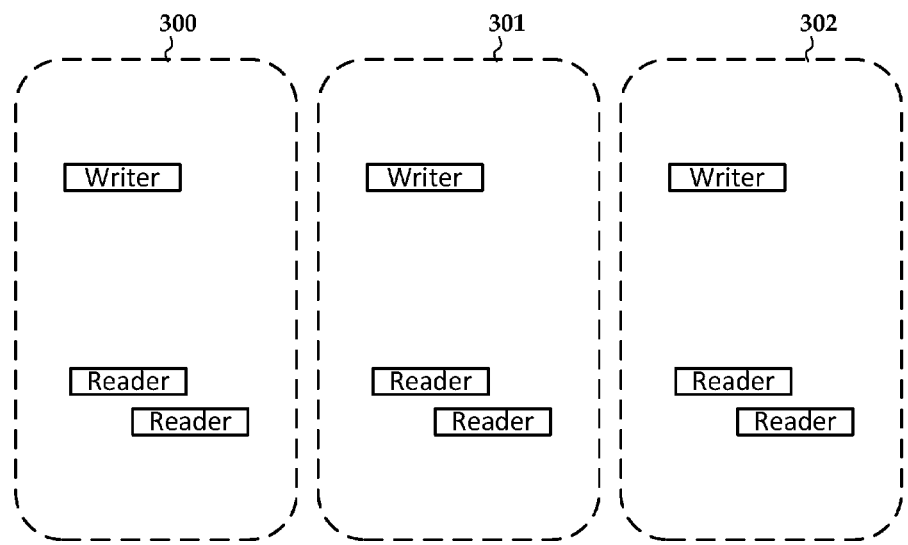
FIGS. 3 and 4 are block diagrams of sensor matrix arrangements according to example embodiments.
Figure 4:
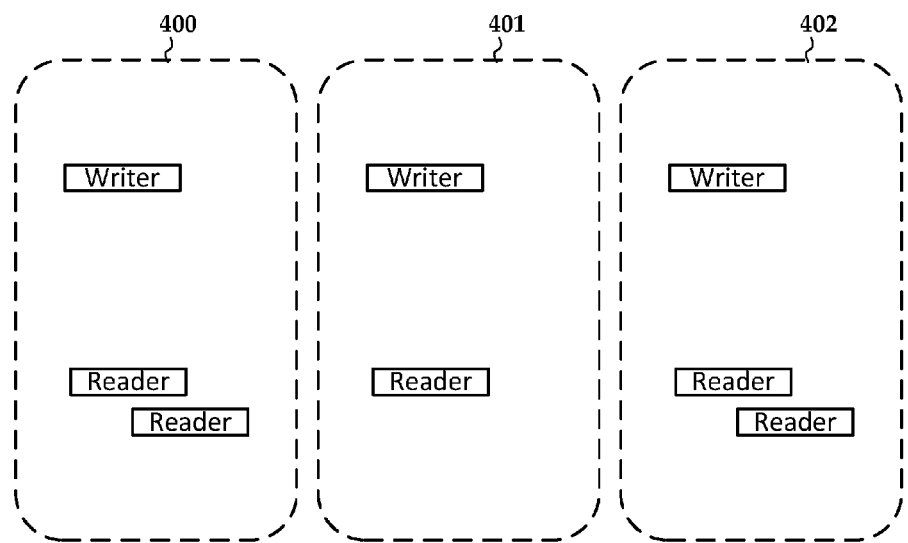

The block diagrams of FIGS. 3 and 4 show sensor matrix arrangements according to example embodiments. In FIG. 3, three groups 300-302 of sensors each include a single writer with dual readers. The arrangement in FIG. 4 is similar, with two groups 400, 402 of a single writer with dual readers, and one group 401 with one writer and one reader. It will be understood that this can be extended to any number of groups greater than one with any number of writers and readers within each group. For example, the arrangements shown in FIGS. 1 and 2 can be combined on the same head/HGA. Further, the characteristics of readers and writers may vary between groups. For example, any combination of read/write width, linear resolution, signal-to-noise ratio, etc., can vary between readers and/or writers of different groups.

Each group of head elements can be turned on and off based on predefined criteria. For example, define each group of writer(s) and reader(s) for a specific data zone, and turn on only the group(s) for each data zone to improve AD. In another example, the writer(s) and reader(s) of a one group that are wider than those of the other groups can be selected to optimize performance at an outer diameter. The other groups can be optimized for AD. In another example, the writer(s) and reader(s) of a group wider than the others and further with readers positioned to access adjacent tracks at the outer diameter may form a group to further optimize the performance of the drive at the outer diameter, with the other groups optimized for AD.

In yet other examples, wider and narrower readers may be placed in different groups. The narrower readers can be used during error recovery for the zones originally assigned to wider readers. In other embodiments, the position (x, y, and Θ) of the writer and reader elements can be optimized within the slider for various zones within the slider. This enables improved AD and data throughput performance for various drive skew angles/zones. For example, different zones may be recorded at different bit aspect ratios (e.g., different combinations of track pitch and linear bit density) and some combinations of readers may be more suited to reading particular bit aspect ratios than others.

Figure 5:
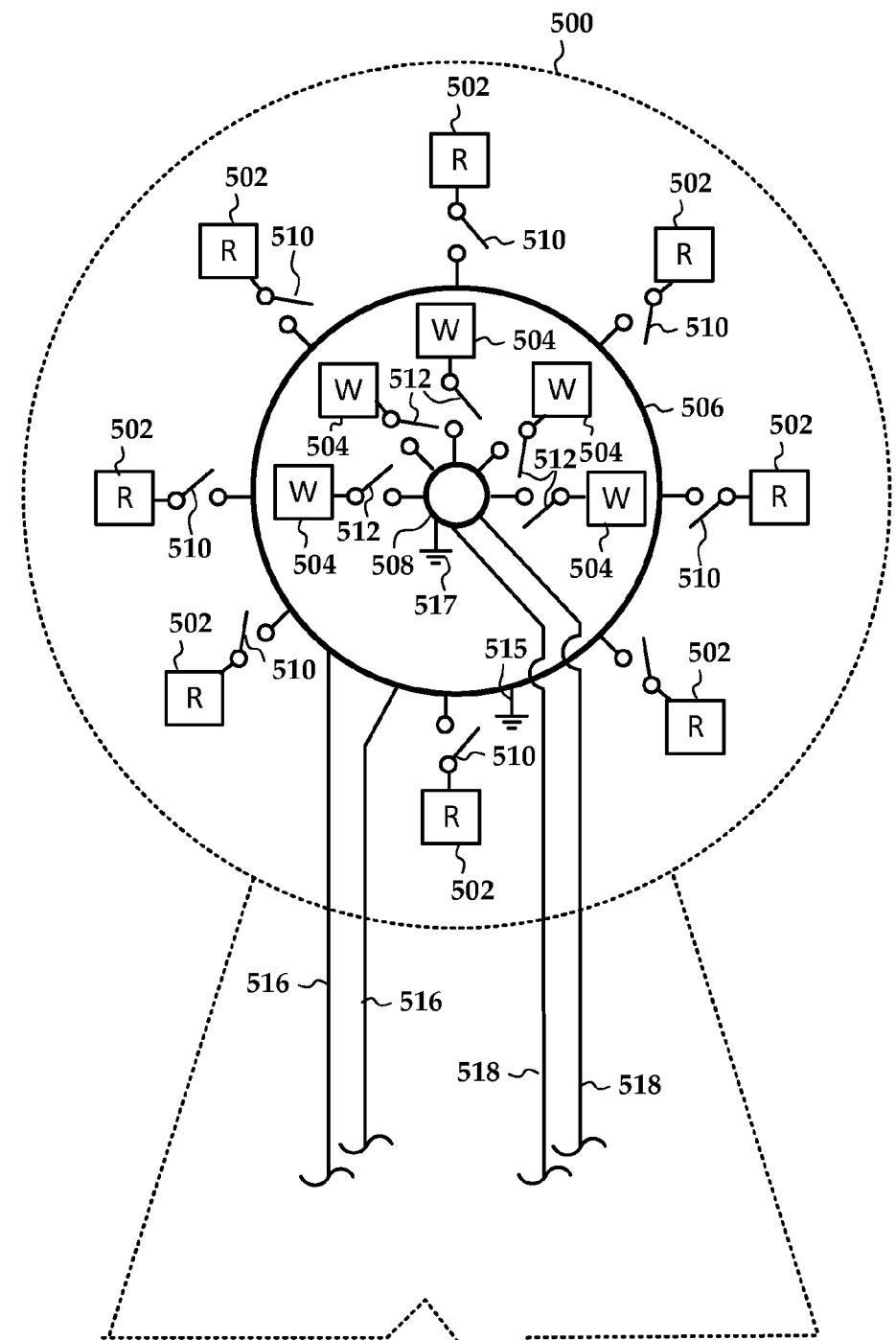
FIG. 5 is a schematic diagram of coupled read/write head elements according to an example embodiment.

In FIG. 5, a schematic diagram shows a read/write head 500 that implements reader/writer groups into according to an example embodiment. Readers 502 and writers 504 are included in the read/write head and can be grouped together in any combination. Busses 506 and 508 are shown that can be selectively coupled to readers 502 and writers 504 via switching elements 510, 512. The write elements 504 may include, in addition to write coils as described above, light delivery systems and transducers used in heat-assisted magnetic recording. Other elements may also be controlled by the switching elements, such as heaters, thermal sensors, etc. The switching elements 510, 512 can be implemented as MOSFETs, transistors, multiplexors, diodes, for example and may be able to switch one or both leads of respective readers 504 and writers 504 to common interconnections. Additional logic (not shown), such as serial interface circuitry may be utilized to reduce the number of switch control signals. Switching may be performed within the recording head or proximate the recording head in a separate die. Alternately, the busses may couple one end of the readers 504 and writers 506 to each other or a common potential (e.g., ground) as indicated by ground symbols 515, 517.

The busses 506, 508 are coupled to sets of leads 516, 518 that carry signals within the read/write head 500 to pads on the side of the recording head. The pads may be bonded or soldered to flexible circuits that connect the switched signals from the recording head to a preamplifier (not shown) or to external controller circuitry (not shown) via actuator arm 520. Control signals for the switches are connected in a similar manner as the signal busses (not shown). While the leads 516 are associated with the readers 502 and leads 518 are shown associated with the writers 504, in some embodiments leads may be used with both readers and writers, being switched over in read or write mode. While two leads are shown for each set 516, 518, more may be used, e.g., for two or more readers for a TDMR read operations, for two or more writers for IMR write operations, etc.

Figure 6:
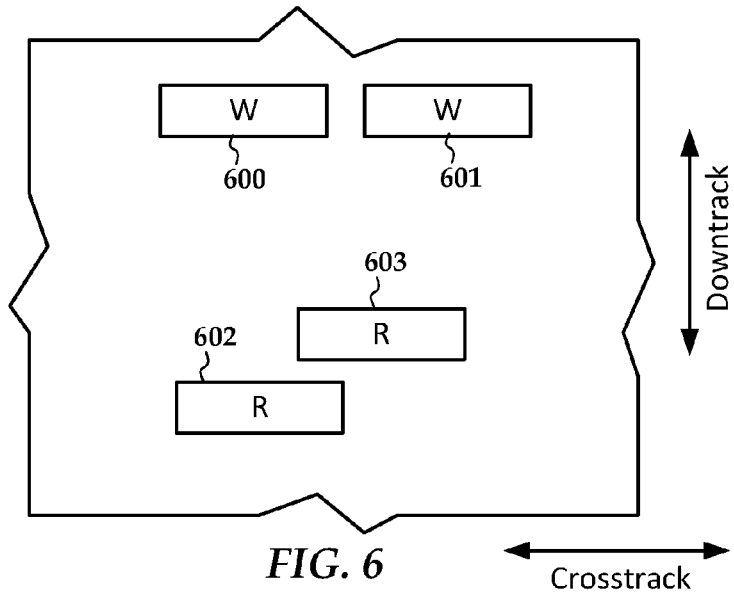
FIG. 6 is a block diagrams of read/write head transducers according to another example embodiment.
Figure 7:
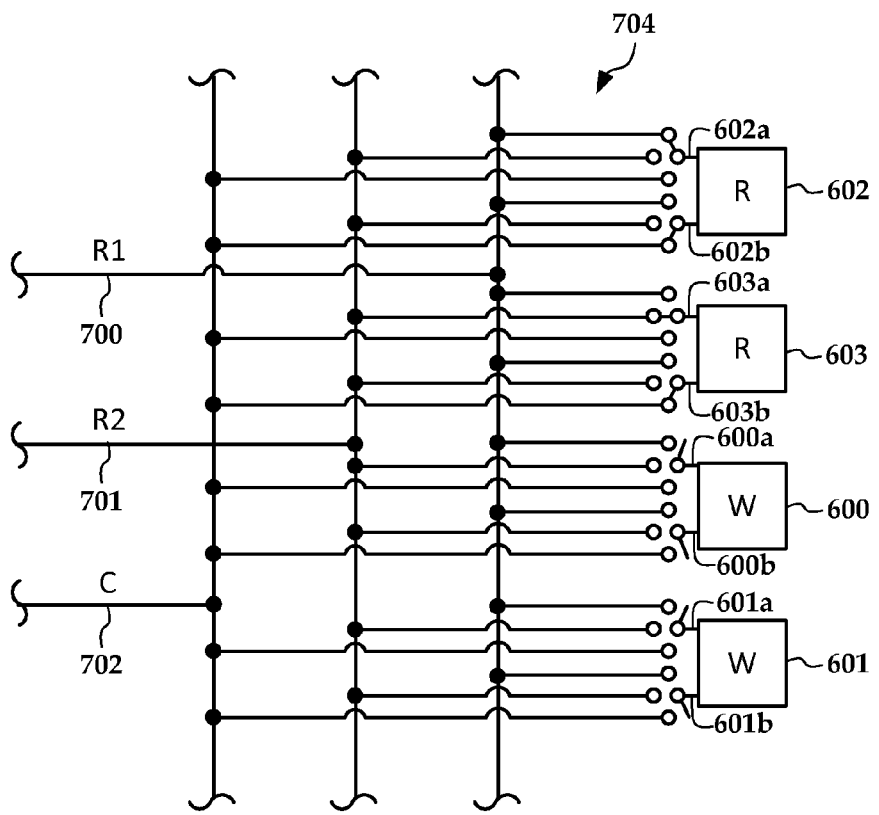
FIGS. 7 and 8 are diagrams showing a switching matrix used with the transducers shown in FIG. 6.
Figure 8:
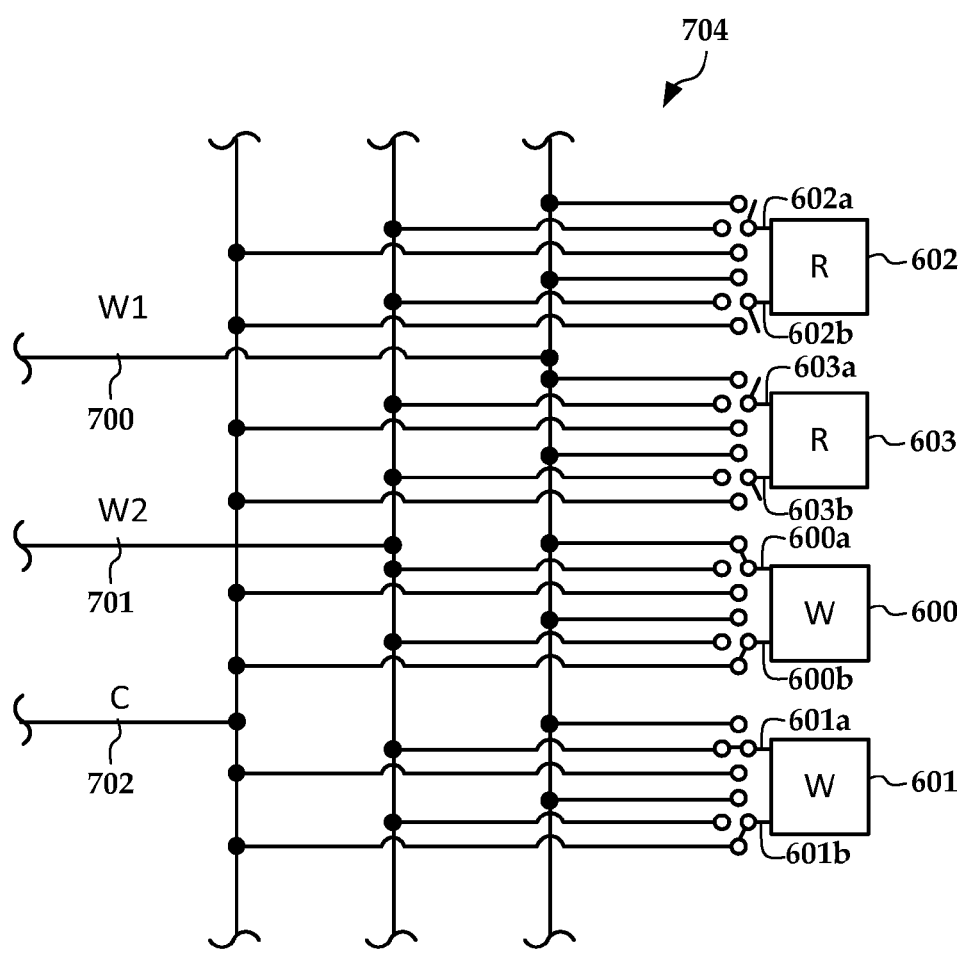

As noted above, the same leads running between the read/write head and control circuitry (e.g., preamplifiers, read/write channels) may be used for both reading and writing depending on the mode. This can be achieved, e.g., by combining the separate busses 506, 508 into a common bus. In FIGS. 6-8, diagrams illustrate an arrangement of readers and writers and how leads can be shared between the readers and writers according to an example embodiment. In FIG. 6, a view from a media-facing surface of a read/write head shows a group that includes two write transducers 600, 601 and two read transducers 602, 603. The read/write head may include additional readers and writers (not shown) that form similar or different groups.

In FIG. 7, a schematic diagram shows three lines 700-702 that carry signals between the read/write head and control circuitry. A switching matrix 704 connects the leads to the transducers 600-603. In the illustrated configuration, one lead 602a of read transducer 602 is coupled to first read signal line 700, and a second lead 602b of read transducer 602 is coupled to common line 702. Similarly, one lead 603a of read transducer 603 is coupled to read signal line 701, and a second lead 603b of read transducer 603 is coupled to the common line 702. In this case, both writers 600, 601 are disconnected from the lines 700-702.

The designation of the lines 700-702 as first/second read line and common line in this example is for purposes of the current mode in which the read/write head is operating, and can change depending on what modes is currently in use. For example, in this mode, the read/write head can operate as a TDMR reader as described in relation to FIG. 2. In FIG. 8, the same transducers 600-603, lines 700-702, and switching matrix 704 is used to enable operation as an IMR writer as described in relation to FIG. 1. One lead 600a of write transducer 600 is coupled to first write signal line 700, and a second lead 600b of write transducer 600 is coupled to common line 702. Similarly, one lead 601a of write transducer 601 is coupled to write signal line 701, and a second lead 601b of write transducer 601 is coupled to the common line 702. In this case, both readers 602, 603 are disconnected from the lines 700-702.

The switching matrix 704 in this example may be controlled in a number of ways. For example, a single signal line may be used that, e.g., transmits a series of bits that are decoded by a logic circuit (e.g., state machine) that sets the switches accordingly. In other embodiments, more than one control line may be used to select a mode, e.g., similar to select lines of a multiplexer.

In the above examples, two signal lines were used with a common line. In other examples, more than three signal lines may be used, such that pairs of readers or writers need not share a common signal line. Further, the example may be extended to any number of read transducers, write transducers, and signal lines. For example, transducers of one type (e.g., reader or writer) may be hard wired as in a conventional device, and groups of transducers of the other type may be selected via the switching matrix. Generally, the use of the switching matrix allows greatly reducing the number of signal lines used in the read/write head. This can be an advantage, because there is limited space on the read/write head on which to attach electrical leads.

Figure 9:
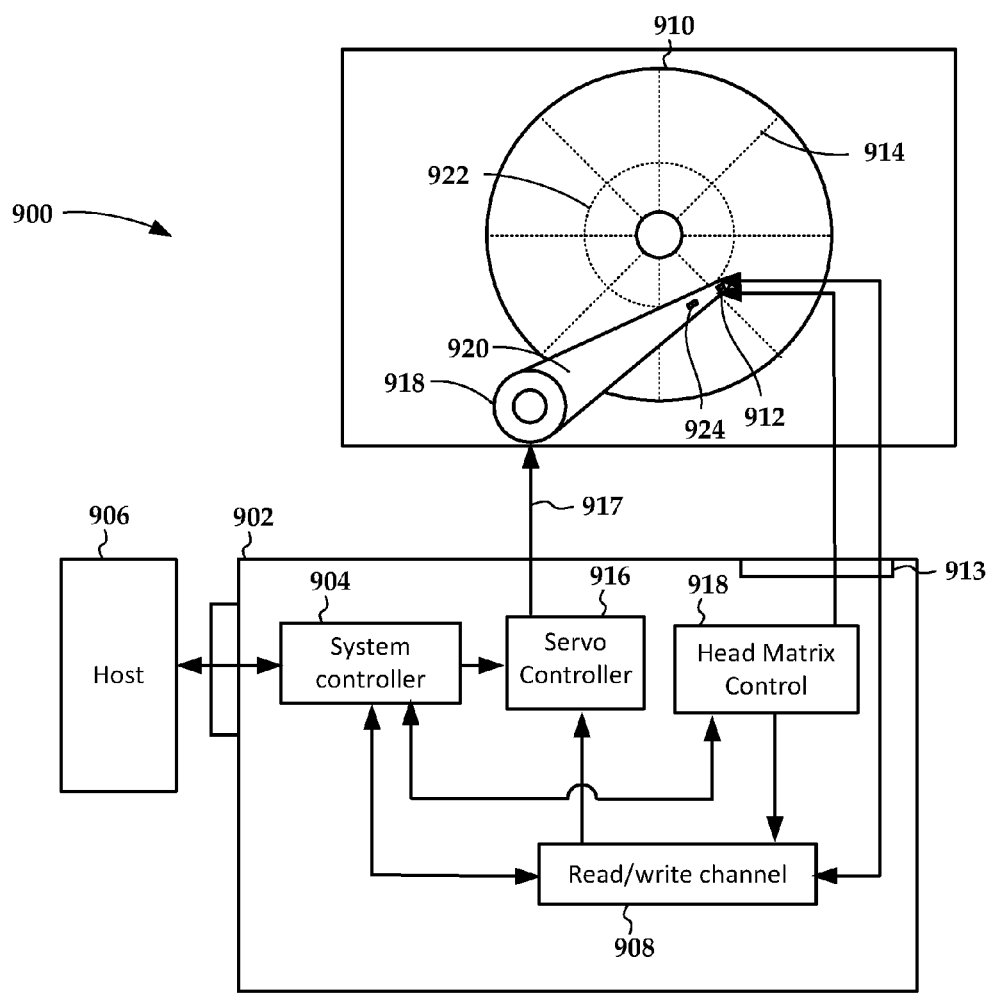
FIG. 9 is a block diagram of an apparatus according to an example embodiment.

In FIG. 9, a diagram illustrates components of a hard drive apparatus 900 that utilizes one or more read/write heads 912 according to an example embodiment. The apparatus includes circuitry 902 such as a system controller 904 that processes read and write commands and associated data from a host device 906. The host device 906 may include any electronic device that can be communicatively coupled to store and retrieve data from a data storage device, e.g., a computer. The system controller 904 is coupled to a read/write channel 908 that reads from and writes to surfaces of one or more magnetic disks 910.

The read/write channel 908 generally converts data between the digital signals processed by the data controller 904 and the analog signals conducted through two or more read/write heads 912 during read operations. To facilitate read and write operations, the read/write channel 908 may include analog and digital circuitry such as decoders, timing-correction units, error correction units, etc. The read/write channel is coupled to the heads via interface circuitry 913 that may include preamplifiers, filters, digital-to-analog converters, analog-to-digital converters, etc.

The read/write channel 908 reads servo data from servo wedges 914 on the magnetic disk 910. These signals are sent to a servo controller 916, which uses the signals to provide position control signals 917 to a VCM 918. The VCM 918 rotates an arm 920 upon which the read/write heads 912 are mounted in response to the control signals 917. The position control signals 917 may also be sent to microactuators 924 that individually control each of the read/write heads 912, e.g., causing small displacements at each head.

At least one of the read/write heads 912 includes two or more first transducers of a first type, the first type selected from a magnetic read transducer and a magnetic write transducer. The read/write heads 912 include a switching element coupled to the two or more first transducers. The switching element is configured to, in response to a control signal, couple a selected one of the two or more first transducers to a preamplifier circuit (e.g., interface circuitry 913) and decoupling others of the two or more first transducers from the preamplifier circuit. The control signals that perform this switching are provided by a head matrix control module 918.

The head matrix control module 918 communicates with the read/write heads 912 either directly or via read/write channel 908. The head matrix control module 918 at least provides analog and/or digital switching signals that reconfigure the read/write heads 912 as described herein. The head matrix control module 918 may operate under control of the system controller 904, e.g., based on a current zone of the disks 910 being read from or written to, based on the apparatus being in an operational mode or recovery mode, based on the apparatus operating in conventional modes (e.g., conventional 1-D perpendicular recording) or other modes (e.g., TDMR, MSMR, IMR, SMR).

The changes made to the read/write heads 912 via the head matrix control module 918 may also induce changes to other control systems. For example, the servo controller 916 may apply changes tracking to account for different locations of a currently selected group of transducers. A clearance control module (not shown) may also change the behavior of actuators in the read/write heads 912 that control a clearance between the heads and the disk 910. For example, the read/write heads 912 may include one or more heaters that change spacing between the transducers and the disk 910 by changing an amount of thermally-induced protrusion at the media-facing surface of the heads 912. Changing a location of currently used read/write transducers of the heads 912 may also change clearance control parameters.

Figure 10:
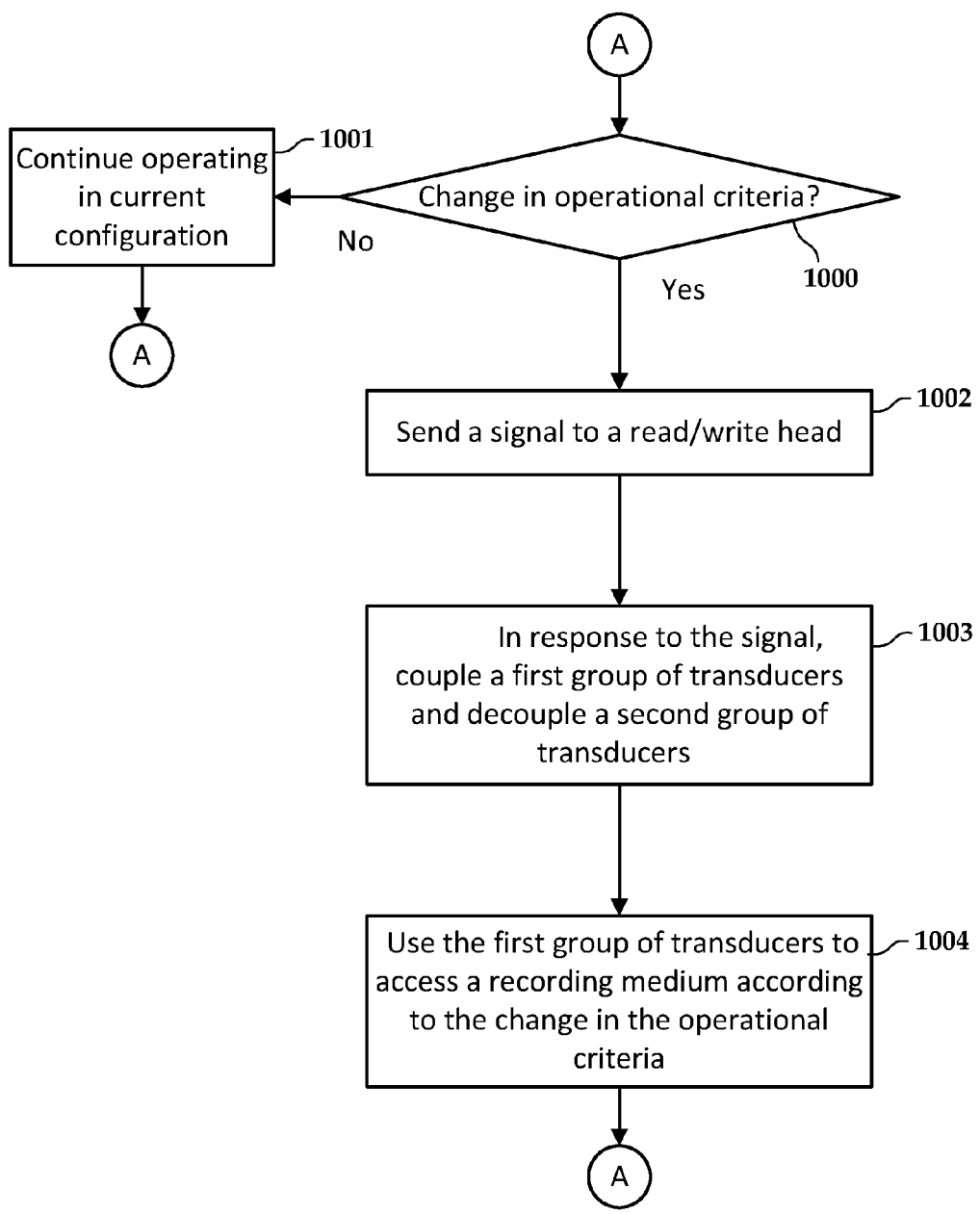
FIG. 10 is a flowchart showing a method according to an example embodiment.

In reference now to FIG. 10, a flowchart illustrates a method according to an example embodiment. The method involves determining 1000 a change of an operational criterion of a disk drive. If no change, the drive continues operating 1001 in a current configuration. The change of criteria may include a change in location of a read/write head, a change between an operational mode and an error recovery mode, a change between read mode and write mode, a change between different types of read/write modes (e.g. conventional, TDMR, SMR, MSMR, IMR, etc.)

In response to the operational criterion being changed, sending a signal is sent 1002 to the read/write head. The read/write head includes a plurality of transducers, the plurality of transducers having at least one of read transducers and write transducers. For example, the read/write head may include two or more read transducers, two or more write transducers, one read transducer and one write transducers, etc. In response to the signal, a switching element of the read/write head couples 1003 a first group of the transducers is to a preamplifier circuit and decouples a second group of transducers from the preamplifier circuit. Thereafter, the first group of transducers is used 1004 to access a recording medium according to the change in the operational criteria.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   two or more first transducers comprising two or more magnetic read transducers located on a common head-gimbal assembly or two or more magnetic write transducers located on the common head-gimbal assembly; and
   a switching element located on the head-gimbal assembly and coupled to the two or more first transducers, the switching element configured to, in response to a control signal, couple a selected one of the two or more first transducers to a preamplifier circuit and decouple others of the two or more first transducers from the preamplifier circuit.

2. The apparatus of claim 1, further comprising two or more second transducers of a second type different than a first type of the two or more first transducers, the two or more second transducers located on the common head-gimbal assembly, the switching element coupled to the two or more second transducers and configured to, in response to the control signal, couple a selected one of the two or more second transducers to the preamplifier circuit and decouple others of the two or more second transducers from the preamplifier circuit.

3. The apparatus of claim 2, wherein the selected first and second transducers form a first group and the others of the first and second transducers form additional groups, wherein the first group and additional groups are selectable via the switching element in response to an operational criterion of the read/write head.

4. The apparatus of claim 3, wherein the operational criterion comprises a radial location of a recording medium over which the read/write head is positioned.

5. The apparatus of claim 3, wherein the operational criterion comprises a change between an operational mode and an error recovery mode.

6. The apparatus of claim 1, wherein the two or more first transducers are configured to operate in a two-dimensional magnetic recording mode.

7. The apparatus of claim 1, wherein the two or more first transducers are configured to operate in at least one of an interlaced magnetic recording mode and a shingled magnetic recording mode.

8. A method comprising:
   determining a change of an operational criterion of a disk drive;
   in response to the change of the operational criterion, sending a signal to a read/write head comprising a plurality of transducers, the plurality of transducers comprising at least one of read transducers and write transducers;
   in response to the signal, coupling, via a switching element of the read/write head, a first group of the transducers to a preamplifier circuit and decoupling a second group of transducers from the preamplifier circuit; and
   using the first group of transducers to access a recording medium according to the change in the operational criteria.

9. The method of claim 8, where the first and second groups each have at least one of the read transducers and at least one of the write transducers.

10. The method of claim 8, wherein using the first group of transducers to access the recording medium according to the change in the operational criteria comprises reading from the recoding medium in a two-dimensional magnetic recording mode.

11. The method of claim 8, wherein using the first group of transducers to access the recording medium according to the change in the operational criteria comprises recording to the recoding medium in at least one of an interlaced magnetic recording and a shingled magnetic recording mode.

12. The method of claim 8, wherein the change in the operational criterion comprises a change in a radial location of the read/write head over the recording medium.

13. The method of claim 8, wherein the change in the operational criterion comprises a change between an operational mode and an error recovery mode.

14. An apparatus comprising:
   a read/write head comprising:
      first and second groups of transducers, the transducers comprising at least one of magnetic read transducers and magnetic write transducers; and
      a switching element coupled to the two or more groups; and
   a controller coupled to the read write head, the controller configured to:
      determine a change of an operational criterion of the apparatus;
      in response to the change of the operational criterion, send a signal to the read/write head, the read/write head coupling the first group of the transducers to a preamplifier circuit and decoupling the second group of transducers from the preamplifier circuit in response to the signal; and
      use the first group of transducers to access a recording medium according to the change in the operational criteria.

15. The apparatus of claim 14, where the first and second groups each have at least one of the read transducers and at least one of the write transducers.

16. The apparatus of claim 14, wherein using the first group of transducers to access the recording medium according to the change in the operational criteria comprises reading from the recoding medium in a two-dimensional magnetic recording mode.

17. The apparatus of claim 14, wherein using the first group of transducers to access the recording medium according to the change in the operational criteria comprises recording to the recoding medium in an interlaced magnetic recording mode.

18. The apparatus of claim 14, wherein using the first group of transducers to access the recording medium according to the change in the operational criteria comprises recording to the recoding medium in a shingled magnetic recording mode.

19. The apparatus of claim 14, wherein the change in the operational criterion comprises a change in a radial location of the read/write head over the recording medium.

20. The apparatus of claim 14, wherein the change in the operational criterion comprises a change between an operational mode and an error recovery mode.

* * * * *